Feb. 10, 1970     P. C. ARQUEMBOURG     3,494,846
IMMUNO-ELECTROPHORETIC METHOD AND APPARATUS
Filed June 11, 1968
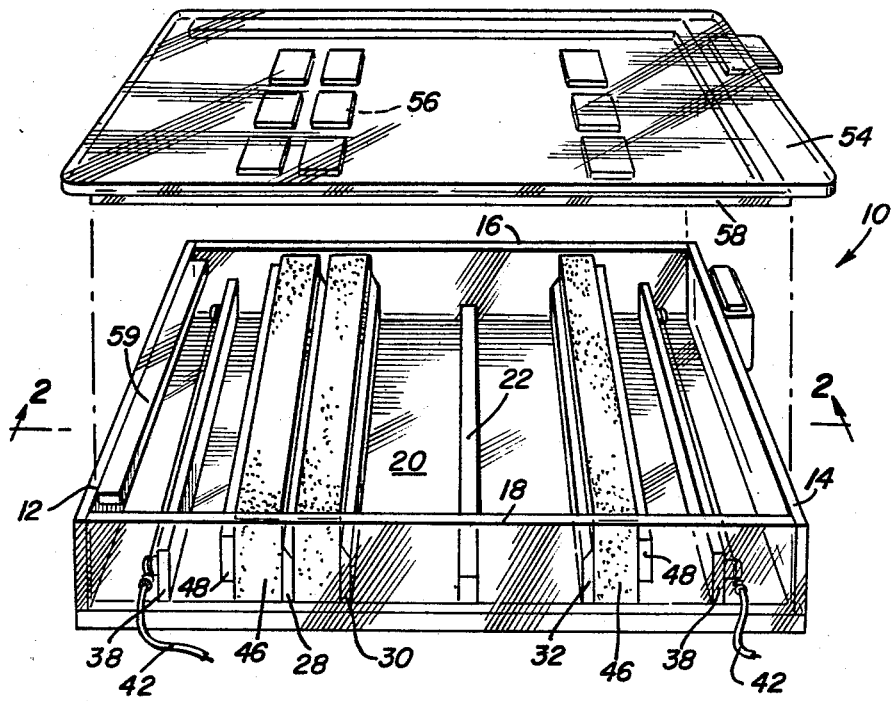
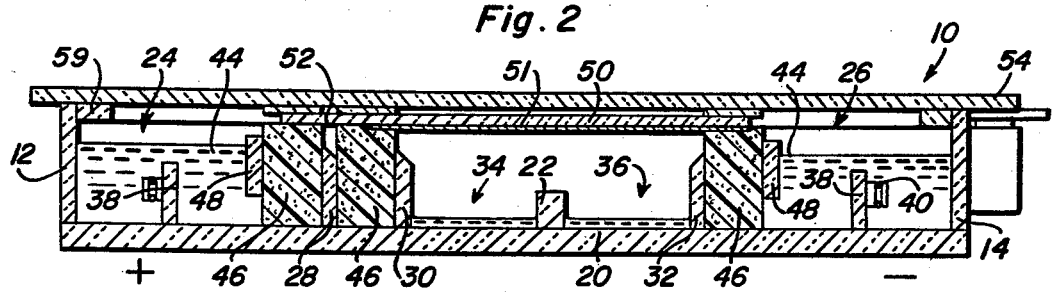
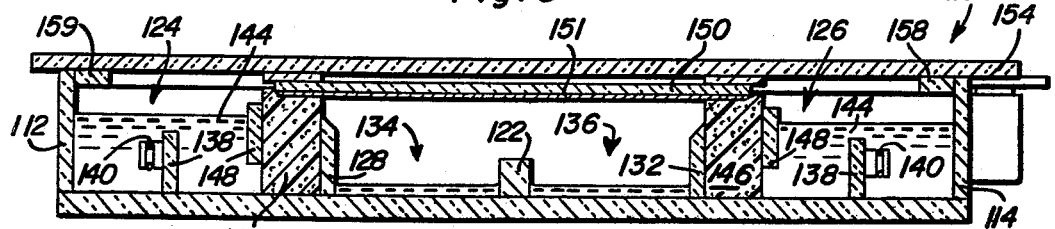
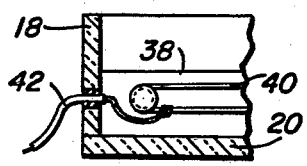
Pierre C. Arquembourg
INVENTOR.
BY Clarence A. O'Brien
and Harvey B. Jacobson
Attorneys United States Patent Office 3,494,846
Patented Feb. 10, 1970

3,494,846
IMMUNO-ELECTROPHORETIC METHOD
AND APPARATUS
Pierre C. Arquembourg, 758 Glencove Lane,
Gretna, La. 70053
Continuation-in-part of application Ser. No. 434,934,
Feb. 24, 1965. This application June 11, 1968, Ser.
No. 736,047
Int. Cl. B01k 5/00; B01d 59/42
U.S. Cl. 204—180                                    8 Claims

ABSTRACT OF THE DISCLOSURE

An electrophoretic cell for carrying forth simple gel and immuno-electrophoresis to obtain a high degree of electrophoretic zonal separation and definition of component fractions of a substance as well as reproducibility between successive runs by the reduction of electrical losses at the electrode-buffer wick and gel-buffer contact in order to reduce the potential drop at the contact and wherein a support plate covered with gel, and containing the substance to be subjected to electrophoresis, is inverted whereby a substantial portion of the surface area of the gel adjacent the opposed ends of the plate is placed in direct contact with the electrode-buffer wick over a significant portion of the surface area of the gel.

This is a continuation-in-part of U.S. application Ser. No. 434,934, filed Feb. 24, 1965, now abandoned.

The present invention relates generally to improvements in the electrophoretic separation of complex substances into their component fractions based upon the migration of differentially charged fractions in a direct current electric field. More particularly, the present invention relates to an improved electrophoresis method and electrophoretic apparatus for conducting the same wherein the electrophoresis supporting medium or gel is disposed downwardly and positioned relative to electrodes so as to obtain a high degree of resolution, definition, and reproducibility as well as versatility such as in the determination of serum components in tissue extracts.

While the present invention is applicable to the field of electrophoresis generally it is more particularly concerned with immuno-electrophoretic analysis. The technique of immuno-electrophoretic analysis was developed by Pierre Graber in order to combine the double diffusion in gel with the additional separation produced by electrophoresis. The combination of electrophoresis and immune diffusion against an anti-serum placed alongside the electrophoretically expanded serum resolves each zone into several components. Each component produces a double-diffusion arc generally differing in position with regard to the distance from the antibody trough. The electrophoretic cell, and method of utilizing the same set forth hereinafter fulfills the essential criteria of reproducibility and high electrophoretic zonal separation necessary for clinical diagnostic purposes. When using immuno-electrophoresis for clinical diagnostic purposes it is not practical to perform techniques for specific identification of each protein. It is therefore essential that all proteins not affected by disease migrate to the same location on successive electrophoresis runs. It is also necessary that electrophoretic zones be sufficiently separated to obtain clarity of arc patterns. Likewise, when dealing with unknown antigens, one must determine their exact electrophoretic mobilities before recognition can be achieved by specific characteristics.

In electrophoresis methods, and apparatuses, provided heretofore the degree of resolution and reproducibility of arc patterns, as well as the definition thereof, are generally somewhat less than highly satisfactory by virtue of an inadequate electrical connection between the electrophoresis zone supporting medium and the electrically charged buffer medium utilized in establishing an electric field across the electrophoresis zone supporting medium. Such prior art devices are generally characterized by a highly undesirable potential drop at the site of the aforementioned charged buffer-electrophoresis medium interface which is conductive to the electrolytic formation of ions in the area of said interface which adversely affect the resolution, definition, and reproducibility obtainable with such prior art method and devices.

Another adverse condition which the prior art has attempted to overcome concerns the formation of heat brought about by the passage of an electric current through a resistance. At least one prior art attempt to counteract such heat formation utilizes heat exchanger means in the electrophoretic cell to carry off the heat produced. However, and as will become more apparent hereinafter, the present invention circumvents the problems in a more direct manner by an improved electrophoretic cell construction and operation. Another adverse condition which the prior art has attempted to overcome concerns the evaporation of solvent, water, from the electrophoresis zone supporting medium, i.e., agar gel, which evaporation reduces the thickness of the gel and thus increases the electrical resistance thereof thereby adversely effecting the mobility of the substance in the gel undergoing electrophoresis. In the carrying forth of the present invention the problems attendant evaporation of solvent from the electrophoresis supporting medium are substantially eliminated.

Two other adverse conditions present in prior art devices concern (1) the formation of ions at the contact between the buffer wetted wicks and the electrophoresis zone supporting gel and (2) the counterflow of buffer by electro-osmosis. With regard to the former condition, buffer wetted sponge contacts proposed heretofore, which contact only the side, i.e., cross-sectional area, of the gel present little contact area and therefore are characterized by high resistance at such point. The potential drop at the contact thus results in a secondary electrolysis at the border of the gel and as discussed heretofore, heat develops at the contact site and tends to dry the gel. With regard to the latter condition, electro-osmosis is probably the most undesirable phenomenon in an electrophoretic cell because it carries the electrically conductive buffer in a direction opposite to the material to be separated by electrophoresis. This tends to re-mix the components and thus, at least partially counteract the electric field developed across the opposed ends of the gel which is supposed to separate the components into clearly defined zonal patterns. In the immuno-electrophoresis of serum proteins, for example, by prior art methods and apparatuses, the electrophoretic zones Alpha 1, Alpha 2 and Beta 1 are often packed into one single "zone." In addition, the gamma globulin extends over all the pattern up to the zone of albumen. Such defects in resolution are usually blamed upon the nature of the gel when in fact they should be blamed on poor cell design, and method of utilization of the cell.

Contrary to the above, the apparatus of the present invention, utilized in carrying forth the method set forth herein, resolves the blood serum proteins, for example, into an electrophoretic zonal pattern having seven distinct zones wherein, even in cases of extreme elevation of the amount of gamma globulin, the overlap of the gamma globulin zone never invaded as much as half of the pattern of the beta fraction. Thus while present technology has not discovered a method or means of completely avoiding the natural phenomenon of counterflow of buffer the present invention minimizes such flow by reduction of the potential drop at the interface between the buffer wetted wick and the electrophoresis zone supporting gel by adjustment of the electro-osmotic flow in the wicks to the same rate as it is in the gel.

As will be apparent from the foregoing, it is an object of the present invention to provide an improved electrophoresis apparatus and method characterized by: suppression of heat development in the electrophoresis zone supporting gel; suppression of evaporation of solvent from the gel; suppression of the potential drop at the buffer wetted wick-gel interface; uniform flow of buffer in the wicks and gel; reduction of electro-osmosis counterflow; significantly improved resolution; a high degree of definition; and absolute reproducibility between successive runs on a particular sample.

Other objects of this invention will be pointed out in the following detailed description and illustrated in the accompanying drawings which disclose, by way of example, exemplary apparatus for carrying forth the method of the present invention.

FIGURE 1 is a perspective, partially exploded, view of an exemplary embodiment of an electrophoretic cell constructed in accordance with the principles of the present invention;

FIGURE 2 is an enlarged vertical cross-sectional view of the cell of FIGURE 1, taken generally along the plane of line 2—2 of FIGURE 1 and further showing the cover of the cell in place thereon with an electrophoresis zone supporting gel-containing plate operatively placed therein with the gel downwardly disposed;

FIGURE 3 is a vertical cross-sectional view, similar to FIGURE 2, taken through another exemplary embodiment of an electrophoretic cell constructed in accordance with the present invention;

FIGURE 4 is a fragmentary vertical cross-sectional view, taken normal to the plane of the line 2—2, and showing certain interior details of the electrodes of the cells of FIGURES 1 and 3; and FIGURE 5 is a somewhat schematic view of the manner in which cells, constructed in accordance with the present invention, can be connected to a suitable conventional source of D.C. potential.

Referring now to the drawings in greater detail, and FIGURE 1 in particular, the numeral 10 indicates an exemplary embodiment of an electrophoresis cell constructed in accordance with the principles of the present invention. The cell 10 includes end walls 12, 14, sidewalls 16, 18, and bottom wall 20. The cell 10 is partitioned adjacent the central portion thereof by a transversely extending partition 22 which extends upwardly from the bottom wall 20 sufficiently to establish chamber means on either side thereof. As seen best in FIGURE 2 the aforementioned chamber means includes a pair of liquid buffer solution chambers indicated generally by the numerals 24 and 26, which chambers are defined by upstanding partitions 28, 30 and 32 respectively. In addition, the chamber means defined between the upstanding partition 22 and the end walls 12 and 14 include overflow buffer chambers 34 and 36.

The buffer solution chambers 24 and 26 are each provided with an electrode support member 38, which as best seen in FIGURE 4 each supports an electrode wire 40 provided with an electrical lead 42 which sealingly passes through the sidewall 18 for connection to a suitable source of D.C. electrical potential. For purposes of discussion herein the electrode in the buffer solution chamber 26 will be understood to comprise the cathode and the electrode in the buffer solution chamber 24 will be understood to comprise the anode of the electrophoresis cell 10. By way of explanation, although it will at first appear as though the electrode supports 38 comprise "partitions" dividing the respective buffer solution chambers 24, 26, it will be understood that the level of the buffer solution 44 in the respecitve chambers is maintained above the upper edge of the support members 38 during utilization of the cell 10.

Briefly turning now to FIGURE 3 it will be noted that the embodiment illustrated therein is substantially the same as that illustrated in FIGURES 1 and 2 with the exception that the embodiment of FIGURE 3 does not include the partitions 30. The reason for such a difference in the embodiments of FIGURES 2 and 3 will become more apparent hereinafter. However, and by way of brief explanation, the aforementioned difference primarily adapts the cell of FIGURES 1 and 2 to accept electrophoresis zone supporting medium coated carrier plates of different lengths. Therefore, it will be seen that analogous components of the device of the embodiment of FIGURE 3 have been similarly numbered relative to the device of FIGURES 1 and 2 with the addition of the prefix of the numeral 1 thereto.

Returning now to the embodiments of FIGURES 1 and 2 it will be seen that the cell 10 includes a plurality of absorbent generally rigid yet resilient porous wicks 46, such as formed of a sponge-like material such as urethane foam, for example, and characterized by interconnecting cells, whereby buffer solution 44 will rise therein by capillary action so as to maintain that portion of the wicks extending above the level of the buffer 44, in the buffer solution chambers 24 and 26, wetted with the buffer solution 44. In the embodiment of FIGURES 1 and 2 the outwardly disposed wicks 46, and in the embodiment of FIGURE 3 both wicks 146, are maintained in position contiguous with their respective partitions 28, 32, 128 and 132 by wick retainers 48 and 148 respectively. The aforementioned wick retainers, which are sealingly fixed to the contiguous sidewalls are spaced from their respective bottom wall 20 or 120 so as to place the innermost wicks 46 and the wicks 146 in direct contact with the buffer solution 44 in the respective buffer solution chambers. In addition, it will be noted that the wick retainers 48 and 148 are so positioned as to extend above the maximum level of the buffer solution 44 so as to preclude direct electrical bridging from the top of the buffer solution, in the respective chambers 24, 26, 124 and 126, to the upper edge portion of the associated wicks 46 and 146.

The previously described structure comprises the essential components of the cell necessary for carying forth electrophoretic separation, in accordance with this invention, of a substance within a gel layer which is in turn supported on a carrier plate. Thus, and before proceeding with a discussion of the remainder of the constructional features of the cell of the present invention it will be seen that plates 50 and 150, such as comprising glass plates of dimensions conventionally utilized in immuno-electrophoretic procedures, are placed upside down upon the wicks 46 and 146 respectively with the electrophoresis zone supporting medium, or gel 51 and 151 thereon contiguous with the wicks. In addition, in the embodiment of FIGURE 2 it will be noted that a bridge means 52, such as comprising a strip of buffer-wetted porometic material, such as of the same material as the wicks 46, co-extending with the two adjacent wicks 46 electrically connects the upper edge portions of the parallelly spaced wicks 46 associated with the anode buffer solution chamber 24. While the features so far described comprise the basic means of the cell necessary for the electrophoretic separation of complex components, a preferred embodiment of an electrophoresis apparatus constructed in accordance with the present invention the apparatus preferably includes a cover 54 or 154, as in the respective embodiments illustrated, and wherein the underside of the cover is provided with pressor means comprising a plurality of downwardly projecting, suitably positioned, blocks 56 and 156, positioned in overlying relation to the respective wicks 46 and 146 so as to urge the respective gel plates 50 and 150 downwardly, and thus the associated gel layers 51 and 151, into uninterrupted contact with the contiguous upper edge portion of the respective wicks 46 and 146 to assist in reducing the electrical resistance at the wick-gel interface. In addition, the covers 54 and 154 are preferably provided with downwardly projecting peripheral seal means such as comprising the rim 58 and 158 which coacts with a complementary rim portion 59 and 159 carried by the upper interior side edge portion of the respective end portions 12 and 112 of the cells 10 and 110, whereby the cell is maintained closed to the ambient atmosphere so as to assist in suppression of evaporation of solvent from the gel 51 and 151 by increasing the vapor pressure within the cell. However, and as will become apparent immediately hereinafter during discussion of the method of utilizing the cells 10 and 110, in accordance with the present invention, it will be appreciated that the cover does not necessarily comprise the primary means of suppressing evaporation from the electrophoresis zone supporting gel inasmuch as the inverting of the gel plate comprises the primary means of suppressing solvent evaporation from the gel.

Referring now more specifically to an exemplary method of utilizing a cell constructed in accordance with the invention, which method will be discussed in conjunction with the embodiment 10 of FIGURES 1 and 2, a plate 50 provided with a layer of gel, i.e., a 4″ by 3¼″ plate covered with approximately 15 milliliters of conventional electrophoresis gel (agar) is placed "upside down" with the gel 51 directly upon the buffer-wetted wicks 46 and wherein the substance to be separated, i.e., a serum protein, is held by capillary action within a well cut in the gel 51. At this point it will be understood that the chambers 24 and 26 have been filled to a point above the member 38 but below the top of the member 48 with a barbital buffer having a pH of 8.2, for example, and comprising diethylbarbituric acid/sodium diethylbarbiturate/sodium chloride as conventionally utilized in electrophoretic procedures. It will thus be appreciated that the gel 51 is in a closed space defined by the bottom wall 20, wicks 40 and wicks 46, thus suppressing evaporation and wherein capillary action causes the buffer solution 44 to travel up the wicks 46 and contact a large surface area of the gel 51 at opposed ends of the plate 50. In the preferred mode of utilization of the cell 10 excess buffer 44 from within the chambers 24 and 26 moves upwardly through the wicks 46, and in the case of the double wick arrangement across the bridge 52 and flows downwardly over the respective partitions 30 and 32, which flow is enhanced by the beveled edge portions thereof, and collects in the respective overflow chambers 34 and 36 which assists in maintaining the gel moist by creating a saturated atmosphere in the enclosure beneath the gel. It will be appreciated, however, that the amount of buffer in the chambers 24 and 26 is regulated so as to ensure that the overflow into the chambers 34 and 36 does not exceed the height of the partition 22 during utilization of the cell. From the foregoing it will be appreciated that the height of the wick and the position of the bevel on the adjacent partition ensures constant wetting of the contact site between the gel and the wick thereby substantially precluding drying out of the contact site. In addition, the pressors 56 on the underside of the cover 54 press the glass plate 50 downwardly against the wicks 46 a uniform distance to ensure uniform contact pressure from run to run and due to the preferred thickness dimension of the pressors, i.e., 1/16″, for example, dissipation of any heat which is developed, which it will be understood is relatively small because of the improved conductivity at the site of the gel wick interface, is readily dissipated through the adjacent cover 54 due to the extremely close operative placement of the glass plate 50 relative to the cover 54.

With the cover 54 in place, and as schematically illustrated in FIGURE 5, a conventional power pack, such as comprising a step-down transformer-full wave rectifier device schematically shown at 70, is conductively connected to the respective leads 42 of the anode in the chamber 24 and the cathode in the chamber 26 wherein through the respective conductive buffer solutions 44 and buffer wetted wicks 46, and bridge 52, a direct current electric field is established across the gel 51 carried by the plate 50. In an exemplary cell, at 5.6 volts per centimeter of gel, it is possible to raise the power to 17 milliamperes per square centimeter of gel cross-section, i.e., 25 milliamperes per plate 4″ x 3¼″ covered with 15 ml. of gel. In the embodiment of FIGURE 2, due to the addition of the extra partition 30, and the wick 46 between the partitions 30 and 28, it is possible to use plates of dimensions which permit "angular" electrophoresis wherein the substance to be separated is subjected to two electrophoretic separation runs and as a result of the repositioning of the plate by rotating it 90 degrees relative to the position of the plate during the first run two separations occur at right angles.

From the foregoing it will be appreciated that a cell constructed and utilized in accordance with the principles of the present invention fulfills the essential criteria of reproducibility and high electrophoretic zonal separation necessary such as when using immuno-electrophoresis for clinical diagnostic purposes. While certain dimensions have been stated herein with respect to the cell it will be understood that electrophoresis cells constructed in accordance with the present invention need not be limited to the exact dimensions discussed or illustrated herein and only need adhere to the principles disclosed herein.

What is claimed as new is as follows:

1. The method of electrophoresis which comprises:
   (a) confining and spacing a buffer solution in a pair of spaced chambers providing a buffer solution overflow chamber means interposed between said pair of spaced chambers;
   (b) providing at least a pair of sponge-like wicks having lower end portions within said spaced chambers, immersed in said buffer solution and extending above the maximum level of the buffer solution in said spaced chambers wherein the upper portions of said wicks are wetted by capillarity;
   (c) providing a non-electrically conductive support member with a film of a gelled electrophoresis zone supporting medium thereon and having therein a substance to be electrophoretically fractionated;
   (d) positioning the support member between said sponge-like wicks with said film of gel downwardly disposed with the surface of said film in intimate surface-to-surface contact with said sponge-like wicks, at a point above the maximum level of buffer in said spaced chambers, the area of said surface-to-surface contact being substantially in excess of the area of the cross-sectional configuration of said film of gel; and
   (e) continuously passing a direct current through the buffer solution and said film of gel for a period of time sufficient to electrophoretically fractionate the substance into constituent groups.

2. The method of claim 1 including maintaining capillary flow of buffer solution up said wicks and through the zone of surface-to-surface contact of said film of gel and said wicks.

3. The method of claim 2 wherein the buffer solution flowing through the contact zone collects in said buffer solution overflow chamber means.

4. The method of claim 2 wherein the buffer solution flowing through the contact zone flows at a rate equal to movement of the buffer in said wick means.

5. An electrophoretic apparatus comprising:
   (a) container means for confining a buffer solution in a pair of spaced chambers;
   (b) wick means in each of said spaced chambers for providing buffer-wetted supports for an electrophoresis zone supporting medium supporting plate member;

(c) an upper portion of said wick means adapted to be extended above the maximum level of buffer solution in said chambers during utilization of the apparatus;

(d) electrode means in each of said spaced chambers for operative connection to a source of D.C. electrical potential for establishing a direct current electric field across a plate member supported by said wicks;

(e) means for maintaining a flow of buffer solution through a zone of contact between the buffer-wetted portion of said wicks and a contiguous electrophoresis zone supporting medium on a supporting plate member normally supported thereby; and (f) said wicks being constructed and arranged to support said plate member with a portion of the surface of the electrophoresis zone supporting medium in surface-to-surface contact with said buffer-wetted portion of said wicks extending above the maximum buffer level in contact with a substantially greater surface area of the electrophoresis zone supporting medium than the area of the cross-sectional area of the zone supporting medium.

6. The combination of claim 5 wherein said means of (a) comprises a single container having transverse partition means defining said spaced chambers, said spaced chambers further defining, buffer solution overflow chamber means therebetween, and means dividing said overflow chamber means into two electrically non-communicated chambers.

7. The combination of claim 6 including cover means for assisting in suppressing evaporation of buffer solvent, and said cover means including means for urging an electrophoresis zone medium supporting plate member into better contact with said wicks.

8. The combination of claim 6 whereby said means for maintaining a flow of buffer solution through a zone of contact between the buffer-wetted portion of said wicks and a contiguous electrophoresis zone supporting medium comprises a beveled upper edge portion of said transverse partition means.

References Cited

UNITED STATES PATENTS

| | | | |
|---|---|---|---|
| Re.24,752 | 12/1959 | Ressler | 204—299 |
| 3,047,489 | 7/1962 | Raymond | 204—180 S |
| 3,114,692 | 12/1963 | MacDonell | 204—299 |
| 3,317,417 | 5/1967 | Raymond | 204—299 |
| 3,374,166 | 3/1968 | Raymond | 204—299 |

JOHN H. MACK, Primary Examiner

E. ZAGARELLA, JR., Assistant Examiner

U.S. Cl. X.R.

204—299